United States Patent [19]
Brandsma

[11] Patent Number: 6,122,626
[45] Date of Patent: Sep. 19, 2000

[54] SPARSE INDEX SEARCH METHOD

[75] Inventor: Ewout Brandsma, Eindhoven, Netherlands

[73] Assignee: U.S. Philips Corporation, New York, N.Y.

[21] Appl. No.: 09/039,350

[22] Filed: Mar. 13, 1998

[30] Foreign Application Priority Data

Jun. 16, 1997 [EP] European Pat. Off. .............. 97201808

[51] Int. Cl.[7] .................................................. G06F 17/30
[52] U.S. Cl. .......................... 707/3; 707/1; 707/2; 707/4; 707/5; 707/6; 707/8; 707/101; 707/104; 707/201; 707/202
[58] Field of Search ................................... 707/1, 2, 3, 4, 707/5, 6, 8, 101, 104, 201, 202; 345/440, 118; 705/26; 382/187, 241; 370/465

[56] References Cited

U.S. PATENT DOCUMENTS

| | | | |
|---|---|---|---|
| 5,724,571 | 3/1998 | Woods | 707/5 |
| 5,873,080 | 2/1999 | Coden | 707/3 |
| 5,875,446 | 2/1999 | Brown | 707/3 |

*Primary Examiner*—Thomas G. Black
*Assistant Examiner*—Diane D. Mizrahi
*Attorney, Agent, or Firm*—Tony E. Piotrowski

[57] ABSTRACT

The invention relates to a method of searching a plurality of values in an ordered list. Given a data set consisting of data items. With each data item one or more attribute values are associated, which are all stored in an ordered list. Efficiently retrieving the data items associated with a particular set of entered values is accomplished by using the list. The list (partially) resides in slow secondary memory and, and a subset thereof, the sparse index, resides in primary memory. Both indexes preserve some natural ordering of the values. The invention proposes to look up the particular set of entered values in the list in one combined operation, rather than individually. The accumulated retrieval time is substantially reduced as a result.

9 Claims, 3 Drawing Sheets

SPARSE INDEX SEARCH METHOD

BACKGROUND OF THE INVENTION

The invention relates to a method of searching among present values in a list with a monotonous ordering for a plurality of entered values, chunks of the list being labeled by respective chunk labels being stored in a sparse index and being representative of respective ranges of the present values contained in the respective corresponding chunks, the method comprising the steps of:

(1) searching the sparse index for a particular hit chunk label representative of a range of values to which a particular entered value belongs;

(2) making a particular hit chunk corresponding to the particular hit chunk label accessible;

(3) searching the particular hit chunk for the particular entered value.

The invention further relates to a system comprising:

(1) a background memory for storing a list of present values with a monotonous ordering;

(2) a foreground memory for storing a sparse index to the list and for providing chunk buffers for keeping chunks of the list;

(3) a query control section for receiving a plurality of entered values;

(4) transfer means for transferring hit chunks from the background memory to the foreground memory;

(5) search means for searching in the foreground memory for particular present values matching the entered values.

The method as defined in the preamble is used in several systems. One can think of a spelling checker which checks whether entered values (words) being part of a text are contained in a list of present values (dictionary) in the system. In this example, the list contains no information but the present values themselves, this being sufficient for the particular function performed by the spelling checker. The monotonous ordering of the list amounts to an arrangement of the constituting present values being such that each successive present value can be said to be, in some sense, larger (or smaller) than its predecessor. For strings, an alphabetical ordering is an example of such an ordering.

In other systems in which the method is used, further information about a present value is stored either along with the present value in the list itself, thus forming a complete data item, or in one or more different locations elsewhere in a storage hierarchy, the present value in the list being accompanied by one or more pointers or other reference means to these particular locations. Also combinations of these two options are possible.

An example of such a system is a patent retrieval system. In such a system one can enter keywords and serial numbers of a number of relevant patent specifications, if any, are output, together with abstracts thereof or even the patent specifications themselves. Referring to the preamble, in this example the present values of the list are the keywords available in the system, and the entered values are the entered keywords. The sets formed by the present and the entered values can be fully or partly overlapping or else, the sets can be non-overlapping. Each present value is accompanied by one or more pointers to storage locations where relevant patent specifications are stored, or is accompanied by a small list of serial numbers of relevant patent specifications. Numerous other data structures can be envisaged.

In any such system, the list provides a kind of main index to the data items forming a data set. Therefore, when dealing with such systems we will use the term "main index" instead of the more general term "list". The main index can be constructed by extracting the present values from the data items automatically when the latter are entered in the system or by entering them separately by hand. The main index provides the system the opportunity to, in response to an entered value, determine the presence of relevant data items by searching the main index, rather than to parse the data items themselves. This is particularly advantageous when the data set is large.

In both the spelling checker and the patent retrieval system, the process of searching the list is substantially accelerated by using the sparse index. Each chunk label in the sparse index represents a chunk of the list. Moreover, from each chunk label it can be deduced what range of present values is contained in the corresponding chunk. With the sparse index, preferably being small enough to be contained in primary memory, it is determined in which chunk of the list the entered value should be located, provided it is available. Subsequently, only that "hit chunk" has to be searched. This is especially advantageous when the list is too large to be contained in a primary memory and resides in a slower secondary memory, such as disk. Then only the hit chunk has to be transferred from the secondary to the primary memory. Of course, this two-level sparse index based data structure, for ease of reference called lexicon in the sequel, could be extended to a tree of an arbitrary number of levels. Also, the mapping of the lexicon on the storage hierarchy can be done in various alternative ways, in which advantageously but not necessarily higher levels of the lexicon are kept on faster accessible storage media than lower levels.

Looking up a single entered value in the lexicon involves a number of time consuming operations. Loading (parts of) the list into primary memory is one delay factor, comprising the setting up of the transfer (e.g. head positioning and rotational latency of a hard disk drive) and the actual transfer itself. Another delay factor is the search process itself. When a linear search algorithm is applied (which is the most straightforward solution for variable length present values), on average half the sparse index and half the hit chunk have to be searched.

Looking up a plurality of entered values is done by looking up each entered value individually. Consequently, the total search time is proportional to the number of entered values.

SUMMARY OF THE INVENTION

It is, inter alia, an object of the invention to provide a method as specified in the preamble, that is substantially faster than the known method. To this end, the invention provides a method as specified in the preamble that is characterized by first sorting the entered values in an order that corresponds to the ordering of the list and subsequently dealing with the entered values in said order. The following aspects of this measure lead to a reduction of search time:

any present value in the list needs to be inspected at most once, because a next entered value to be searched for will occur at or after that position, as it occurs later in the ordering;

the hit chunks are searched in the order in which they are present in the list. When the chunks are stored in a storage medium comprising mechanical positioning means, such as a hard disk, the necessary transfer of the hit chunks to the main memory for the actual searching requires minimal accumulated positioning distance and therefore minimal accumulated positioning time;

each chunk in the lexicon is transferred at most once, because a next entered value to be searched for will be located in that chunk as well or in a chunk after that chunk, as the next entered value occurs later in the ordering.

The combined effect of these aspects is that the invention allows to combine all accesses into one merge-like operation.

The measure defined in dependent claim 2 leads to a further reduction of search time since any present value in the sparse index needs to be inspected at most once, because a next entered value to be searched for will occur at or after that position, as it occurs later in the ordering. A further advantage of this measure is that the chunk labels could be chosen to be the first (or the last) present value of each chunk. Then, since the sparse index has a monotonous ordering, it is apparent which ranges of present values are covered by particular chunks from comparing particular consecutive chunk labels.

The measure defined in dependent claim 3 leads to a further reduction of search time since early on in the search process it is known which chunks have to be transferred to primary memory. Then these transfers can be optimized with respect to accumulated transfer time. For example, hit chunks that are stored consecutively in secondary memory are transferred consecutively, thus reducing accumulated transfer overhead time (e.g. head positioning and rotational latency in hard disk drives). Note that this measure will be advantageous only in the case that the entered values are dealt with in said order, as prescribed by the characterizing part of claim 1. After step 1 has finished, the sparse index does no longer have to be referenced and the search can be completed by repeating steps 2 and 3 until all hit chunks are searched.

The measure defined in dependent claim 4 further reduces the accumulated search time. Most present day computer systems have dedicated hardware for transferring data between secondary and primary memory (e.g. DMA Direct Memory Access hardware) that allows a program requesting a chunk from secondary memory to proceed before this hardware has completed the request. The measure of claim 4 takes advantage of this feature. Especially for slow CD based media this leads to a significant search time reduction.

The measure defined in dependent claim 6 has the advantage that the sparse index can be shorter since the chunk locations are implicitly known from the location of the corresponding chunk label in the sparse index, and therefore explicit references to chunk locations are no longer necessary. This also allows more efficient coding of the software implementing the method.

A system according to the invention is characterized in that the query control section is arranged for sorting the entered values according to the ordering of the list.

Further advantageous aspects are recited in dependent claims.

The invention is further explained below by way of example, with reference to the accompanying drawing in which

DESCRIPTION OF THE PREFERRED EMBODIMENT

Figure 1:
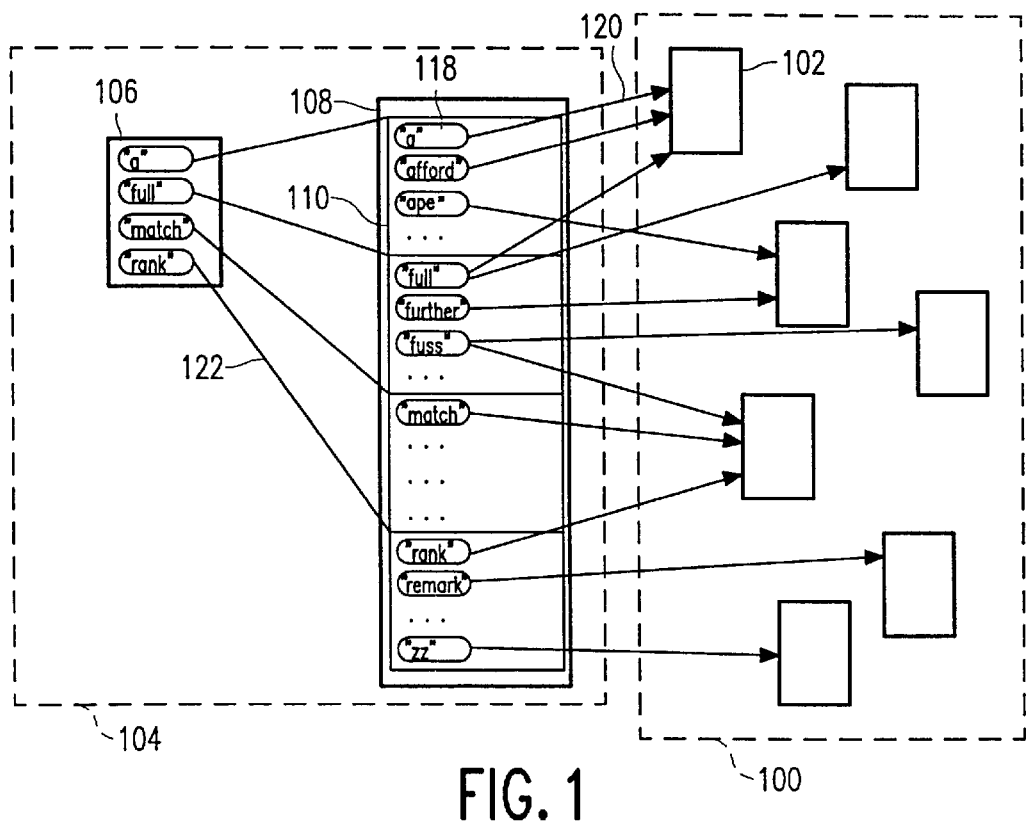
FIG. 1 shows a known data structure to which the method according to the invention can be applied.

FIG. 1 shows a known data structure to which the method according to the invention can be applied. It shows a data set 100 comprising data items 102, and a related lexicon 104 comprising a sparse index 106 and a main index 108. The main index 108 comprises present values 118, which are variable length strings (words), and references 120 to associated data items 102. If the data items 102 are relatively compact, it could be imagined that the main index 108 and the data items 102 are merged. The main index 108 is stored in a secondary memory (disk) and is subdivided into chunks 110. As secondary memory is typically organized as a sequence of fixed size units of data (e.g. sectors or blocks), it is particularly efficient to choose the size of the chunks 110 to be an integer number of such units.

The first present value of each chunk 110 is stored in the sparse index 106, which is kept in a primary memory. Each entry in the sparse index is accompanied by a chunk pointer 122 to a location of the corresponding chunk. The use of a sparse index prescribes that the present values of the main index are ordered according to some kind of an ordering. In FIG. 1 an alphabetical ordering is applied, which is the most straightforward ordering for strings.

Instead of the previously introduced term "present value", we will employ the term "attribute value" which is more commonly used in connection with data structures as the one of FIG. 1, since here the present values are actually attributes of the corresponding data items. The exact nature, content and size of the data items 102 is irrelevant.

Finding data items, if any, that are associated with a set A of N entered values $v_i$, with i=1–N, amounts to searching in the main index 108 for matching attribute values and subsequently following the references. The problem at hand is to efficiently search in the main index for matching attribute values.

Figure 2:
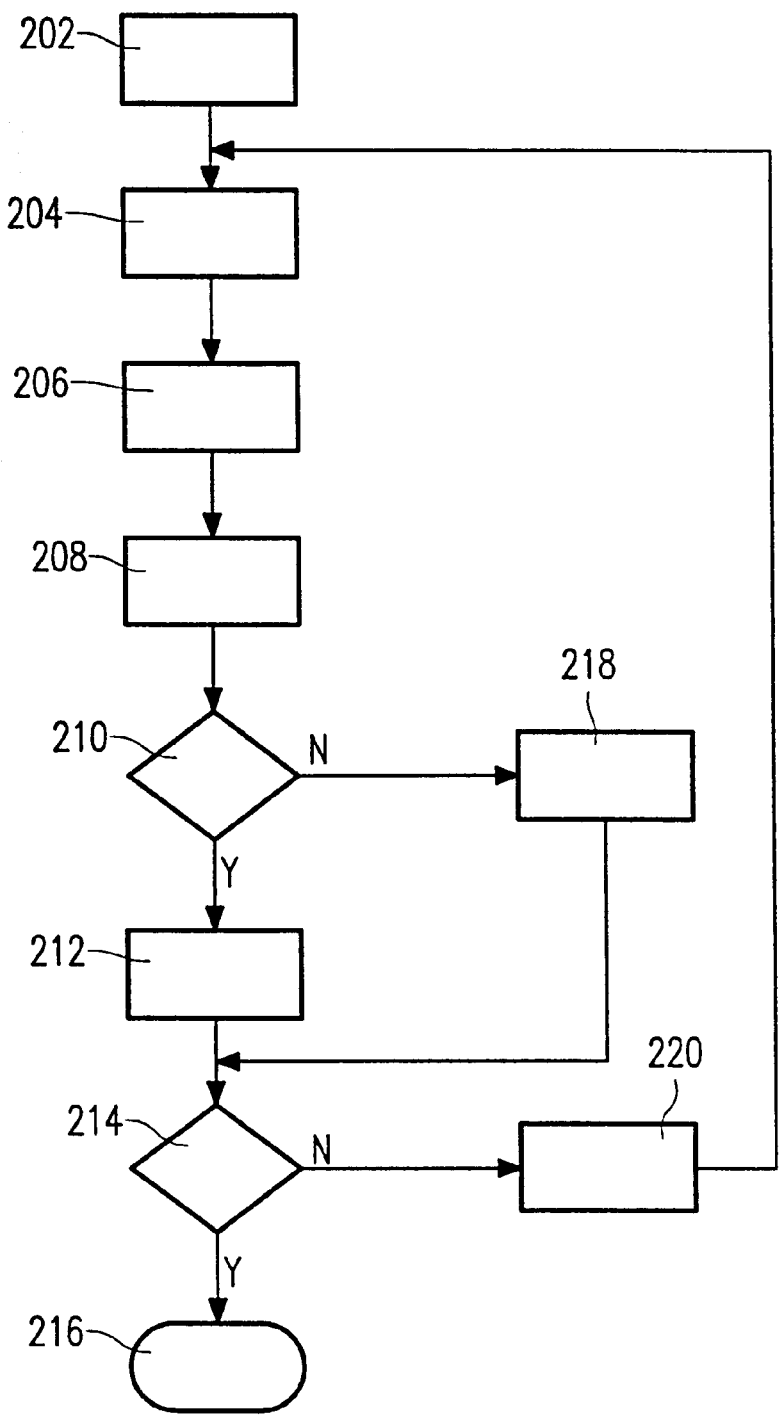
FIG. 2 shows a flow chart of a prior art method of searching for a plurality of entered values in a data structure of as the one of FIG. 1.

FIG. 2 shows a flow chart of a prior art method of searching for a plurality of entered values in a data structure of as the one of FIG. 1. With the aid of the lexicon 104, looking up the data items associated to the entered values $v_i$ of set A now proceeds as follows. First, in step 202, a first attribute value $v_i$ is selected from A. Then in step 204 the sparse index in primary memory is searched for the last attribute value<=$v_i$ and a corresponding chunk is copied from secondary memory into primary memory in step 206. This chunk is searched for the first attribute value>=$v_i$ in step 208. If it equals $v_i$ the attribute value has been found, otherwise it is not associated with any data item. This is determined in step 210, after which the method proceeds either with step 218 by notifying that no match has been found related to this particular entered value or with step 212 in which the data item(s) referenced by the found attribute value is (are) output.

Now that the procedure has dealt with $v_i$, it is determined in step 214 whether all elements of A are dealt with. If this is the case, the method ends in step 216. Otherwise, in step 220 the next unprocessed element $v_{i+1}$ of A is selected and the method is restarted for this attribute value in step 204. In this way, all elements of A are successively dealt with.

Looking up a single attribute value and its associated data item reference in the lexicon involves the following time consuming operations:

Searching the sparse index in primary memory. If this is a linear search (which is the most straightforward solution for variable length attribute values) on average half the sparse index needs to be searched.

Positioning the read mechanism of the secondary storage medium towards the beginning of the corresponding chunk. For a typical secondary storage medium (disk) the time taken increases with the distance (number of chunks) the read mechanism has to travel.

Transferring the data of the entire chunk to primary memory.

Searching the chunk in primary memory. Again on average half the chunk needs to be searched.

By repeating these operations for each individual entered value, as described in FIG. 2, the total search time is proportional to the number of entered values in A.

Figure 3:
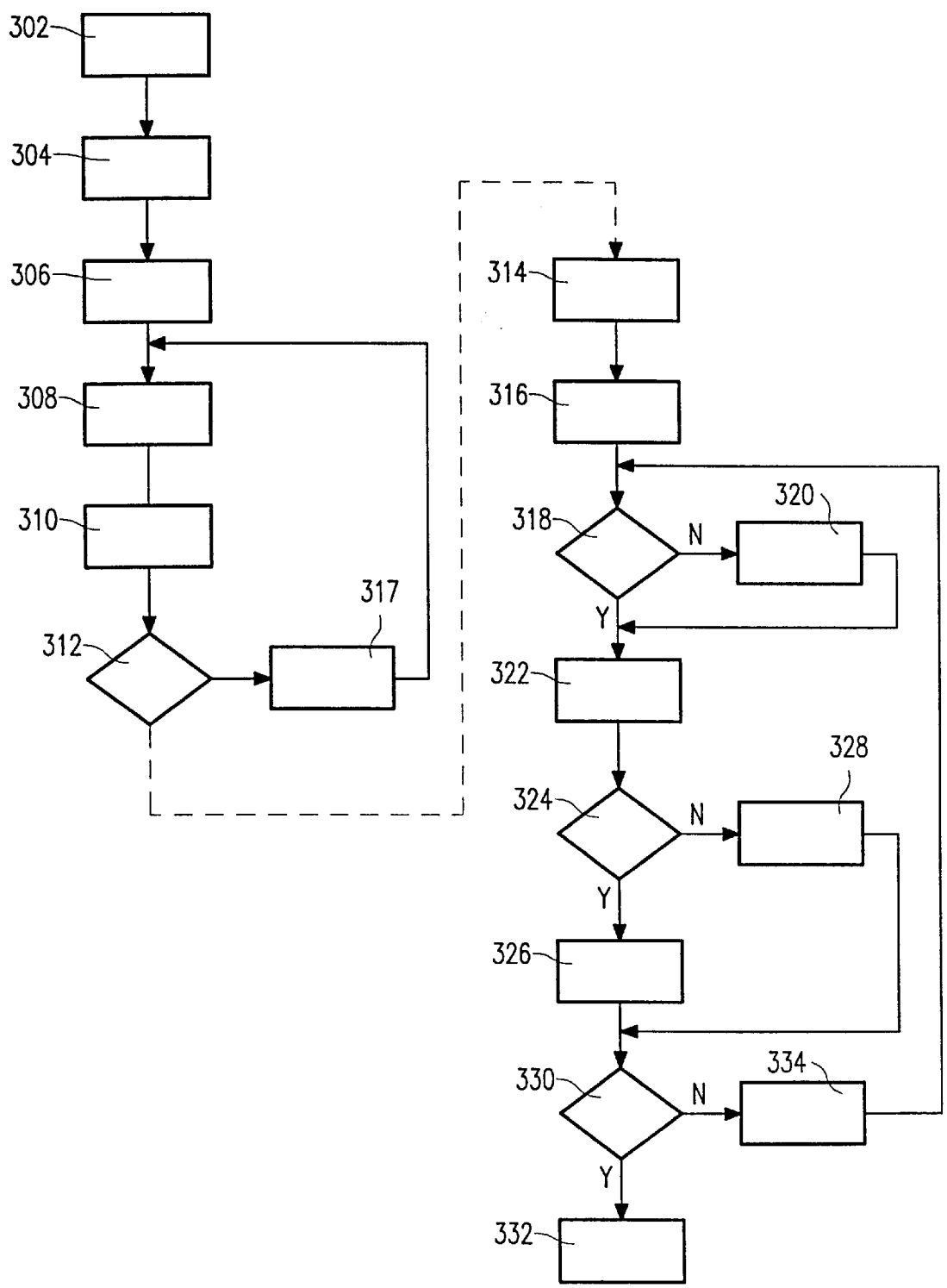
FIG. 3 shows a flow chart of a method according to the invention.

FIG. 3 shows a flow chart of a method according to the invention. The starting point is again the data set 100 and the lexicon 104 over attribute values 118 of its data items 102, and the set A of entered values. The method according to the invention, being essentially a groupwise lookup of all entered values of A, proceeds along the following lines. First, in step 302 A is sorted according to the ordering of attribute values 118 in the main index. Then in step 304 a pointer p is initialized to the beginning of the sparse index 106. The attribute value to which p points is denoted as w(p). In step 306 a first entered value $v_i$ of the set A, being the first in the ordering, is selected. Subsequently, in step 308 the pointer p is proceeded from its current position to the last attribute value w(p) for which $w(p) <= v_i$. Then in step 310 the chunk pointer of w(p) is noted in a table. Now that the procedure has dealt with $v_i$, it is determined in step 312 whether all elements of A are dealt with. If this is the case, the method proceeds with step 314. Otherwise, in step 317 the next unprocessed element of (the ordering of) A is selected and the method is restarted for this entered value in step 308. In this way, all elements of A are successively dealt with.

Note that at this stage the table contains for each entered value a corresponding chunk pointer, and that there are at least one and at most N different chunk pointers. The chunk pointers reference the hit chunks to be transferred to primary memory to be searched.

In step 314 a chunk buffer B with the size of a chunk is created. In step 316 the first entered value $v_i$ of (the ordering of) A is selected and its associated chunk pointer $n(v_i)$ is read from the table obtained in the preceding steps. In step 318 it is determined whether the chunk pointer referencing the current chunk in B equals $n(v_i)$. If not, in step 320 the chunk referenced by chunk pointer $n(v_i)$ is read into buffer B and a pointer q is initialized to the beginning of the chunk in B. Otherwise the method skips step 320 and immediately proceeds with step 322, with q unaltered.

In step 322 pointer q is proceeded from its current position to the first attribute value w(q) in B for which $w(q) >= v_i$; Then, in step 324 it is determined whether w(q) equals $v_i$ or not. If yes, in step 326 the data item $d(v_i) = d(w(q))$ is output, with d(w(q)) denoting the data item associated with attribute value w(q). If not, in step 328 it is noted that entered value $v_i$ is not present in the main index 108. Either way, the method proceeds by determining in step 330 whether all elements of A are dealt with. If this is the case, the method ends in step 332. Otherwise, in step 334 the next unprocessed element $v_{i+1}$ of (the ordering of) A is selected and the method is restarted for this attribute value in step 318.

Another option would be that in step 326 only a results table is created. Then, after execution of the method it is known whether a particular attribute value $v_i$ in A is present in the main index, and if so what its associated data item (reference) $d(v_i)$ is.

In step 314, the lexicon chunks that have to be read are all known (from the chunk pointers $n(v_i)$). In a more advanced embodiment of the method, this property could be exploited by reading arbitrarily far ahead in the lexicon. Hereto, buffer B is substituted by a set of (two or more) chunk buffers and an autonomous reader process is started which takes care of keeping these buffers filled as much as possible, with the hit chunks required (and in the order required). This process will start reading as all entered values are dealt with in step 312, or even as soon as the table is not empty. Synchronization is necessary to avoid that buffers are refilled before their contents are processed and, vice versa, that processing the contents of a buffer may not start before it is filled.

If the representative values in the sparse index are sorted according to aforementioned ordering as well, the ordinal number of a value in the sparse index equals the ordinal number of the associated chunk in secondary memory. If the chunks have equal size, the latter number uniquely defines a storage location. This way the location of the chunk is coded implicitly, and the chunk labels in the sparse index do not have to be accompanied by chunk pointers.

Figure 4:
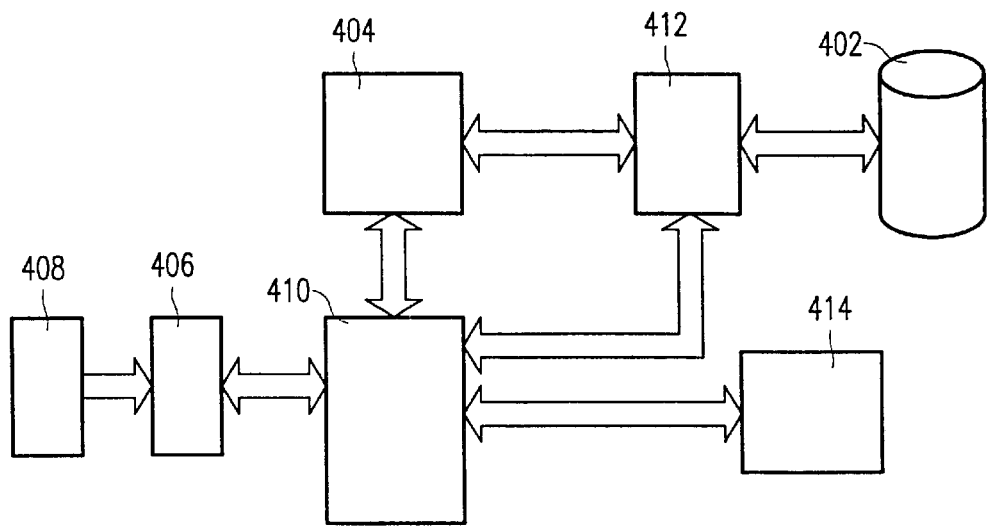
FIG. 4 shows a block diagram of a system according to the invention.

FIG. 4 shows a block diagram of a system according to the invention. The system comprises a background memory (disk) 402 for storing a list and a foreground memory (SRAM/DRAM) 404 for storing a sparse index to the list. The foreground memory 404 also provides chunk buffers for the actual searching in the list of present values. A query control section 406 is provided for receiving a plurality of entered values through a keyboard 408. Search means 410 are provided for searching according to the method of the invention and for general control of the system. Transfer means 412 are provided for transferring hit chunks from the background memory 402 to the foreground memory 404. Finally, output means 414 are provided for outputting search results.

In order to make the system suited for application of the method of the invention, the query control section is arranged for sorting the entered values according to the ordering of the list.

When the present values in the list reference a collection of documents, the system is a full-text retrieval system. The purpose of a full text retrieval system is to find documents that are relevant to a user query in a large collection of textual documents. An advantage of the present invention is that query texts for the system may become arbitrarily large. A particularly powerful possibility is using a document from the collection as a query itself. The system will then look for "similar" documents. A document of a few pages in size may contain hundreds of different terms however. A system according to the invention makes these kind of queries very efficient to execute, even on slow secondary storage media such as CD ROM and CD i.

While the present invention has largely been described with reference to the simple data structure of FIG. 1, it is noted explicitly that the invention can be applied to other and more complex data structures. For example, when the lexicon comprises a tree of an arbitrary number of levels, the higher levels being further sparse indexes, the principles of the invention can be repeated at each level. In another alternative to the data structure of FIG. 1, each present value in the main index comprises a reference to a respective further chunk of data (called a posting list in the context of full-text retrieval systems). At least one further chunk of data comprises either a respective plurality of data items associated with the relevant present value or references to these data items. The measures of the invention can also be applied to the process of collecting the data items or their references in such a data structure. Notably the prefetching of the further chunks can lead to significant performance gain.

What is claimed is:

1. A method for a data processing apparatus of searching data in an ordered list for at least one search value, chunks of the list being labeled by respective chunk labels, the chunk labels being stored in a sparse index and being representative of respective ranges of the data contained in the respective corresponding chunks, the method comprising the steps of:

(1) sorting the search values, if there are more than one, in an order that corresponds to the ordering of the list:

(2) searching the sparse index for a hit chunk label representative of a range of values to which at least a first search value in the sorted search values belongs;

(3) accessing the hit chunk corresponding to the hit chunk label representative of the range of values to which the first search value belongs; and (4) searching the hit chunk for the first search value.

2. The method as claimed in claim 1, wherein the sparse index is sorted in an order that corresponds to the ordering of the list.

3. The method as claimed in claim 2, wherein said step (2) includes creating a table containing a plurality of hit chunk labels.

4. The method as claimed in claim 3, wherein said step (3) is performed substantially in parallel with said step (4), wherein while performing said step (4) on the hit chunk corresponding to the hit chunk label, one or more next hit chunks corresponding to next hit chunk labels from the table are prefetched.

5. The method as claimed in claim 4, wherein the chunks have equal length.

6. The method as claimed in claim 5, further comprising the step of determining a location of one hit chunk from a position of a corresponding chunk label in the sparse index.

7. A data processing system comprising:

a first memory which includes a stored list of data values with a predetermined ordering;

a second memory which includes a stored index to the lists a chunk buffer arranged to store at least one chunk of the list;

a transfer controller arranged to transfer at least one chunk from the first memory to the second memory;

a search controller arranged to search in the second memory for data values that match search values, wherein the search values are sorted according to the ordering of the list.

8. A data processing apparatus comprising:

a memory system which stores executable code, an ordered list of data, an index of section labels corresponding to respective sections of the list, the section labels being representative of respective ranges of the data contained in respective corresponding sections; and a processor which executes the code stored in the memory so as to (i) sort search values in an order that corresponds to an ordering of the list, (ii) search the sparse index for a section label representative of a range of values to which at least one search value belongs, (iii) access the section corresponding to the section label representative of the range of values to which the one search value belongs, and (iv) search the section for the one first search value.

9. A memory medium comprising code for a data processing apparatus including an ordered list of data, an index of section labels corresponding to respective sections of the list, the section labels being representative of respective ranges of the data contained in respective corresponding sections, the code comprising:

code for sorting search values in an order that corresponds to an ordering of the list;

code for searching the sparse index for a section label representative of a range of values to which at least one search value belongs;

code for accessing the section corresponding to the section label representative of the range of values to which the one search value belongs; and code for searching the section for the one search value.

* * * * *